US008776725B1

(12) United States Patent
Grijalva (10) Patent No.: US 8,776,725 B1
(45) Date of Patent: Jul. 15, 2014

(54) PET WAITER SYSTEMS

(71) Applicant: Enedina Grijalva, Laveen, AZ (US)

(72) Inventor: Enedina Grijalva, Laveen, AZ (US)

(*) Notice: Subject to any disclaimer, the term of this patent is extended or adjusted under 35 U.S.C. 154(b) by 0 days.

(21) Appl. No.: 13/853,579

(22) Filed: Mar. 29, 2013

Related U.S. Application Data

(60) Provisional application No. 61/649,548, filed on May 21, 2012.

(51) Int. Cl.
*A01K 5/01* (2006.01)

(52) U.S. Cl.
USPC .................................... 119/61.57; 119/51.01

(58) Field of Classification Search
CPC ..... A01K 5/02; A01K 5/0208; A01K 5/0216; A01K 5/0225; A01K 5/0233; A01K 5/0266; A01K 5/0275; A01K 5/0291
USPC .............. 119/1.57, 51.5, 51.01, 51.11, 51.12, 119/51.13, 52.1, 53, 55, 57, 57.5, 57.6, 119/57.7, 57.92, 58, 60, 63, 61.56, 72, 72.5, 119/74, 76, 81, 454, 456, 457, 475, 476, 119/477, 478, 521; D30/122, 132, 133; 211/1.57, 26, 26.1, 26.2, 71.01, 74, 75, 211/87.01, 88.01, 103, 175, 207, 209; 248/295.11, 297.11
See application file for complete search history.

(56) References Cited

U.S. PATENT DOCUMENTS

| | | | | | |
|---|---|---|---|---|---|
| 3,256,861 | A | * | 6/1966 | Giltner | 119/51.11 |
| 3,782,332 | A | * | 1/1974 | Depenthal et al. | 119/51.13 |
| 4,051,812 | A | * | 10/1977 | DeLoach et al. | 119/51.11 |
| 5,000,124 | A | * | 3/1991 | Bergen | 119/63 |
| 5,054,431 | A | * | 10/1991 | Coviello | 119/61.56 |
| 5,433,171 | A | * | 7/1995 | Ewell | 119/51.5 |
| 5,584,263 | A | * | 12/1996 | Sexton | 119/51.5 |
| 6,105,794 | A | * | 8/2000 | Bauer | 211/94.01 |
| 6,135,056 | A | | 10/2000 | Kuo | |
| 6,988,465 | B2 | | 1/2006 | Park | |
| 7,278,371 | B1 | * | 10/2007 | Lato | 119/51.5 |
| 7,318,391 | B2 | * | 1/2008 | Brillon | 119/61.57 |
| 7,469,657 | B2 | | 12/2008 | Drummond | |
| 8,082,883 | B2 | * | 12/2011 | Aletti | 119/61.57 |
| 8,196,549 | B2 | * | 6/2012 | Seagraves | 119/477 |
| 8,245,665 | B2 | | 8/2012 | Willett | |
| 8,479,686 | B2 | * | 7/2013 | Johnson | 119/61.57 |
| 2012/0256069 | A1 | * | 10/2012 | Fallows | 248/295.11 |

* cited by examiner

*Primary Examiner* — Isam Alsomiri
*Assistant Examiner* — Ebony Evans
(74) *Attorney, Agent, or Firm* — RG Patent Consulting, LLC; Rachel Gilboy (57) ABSTRACT

Pet Waiter Systems is an innovative and useful device for easily and efficiently feeding domesticated pets, such as cats and dogs. The systems may include a pet nourishment station assembly, a container holding member, a tray elevator assembly, and a motor assembly. In use, a nourishment tray may integrally include a stainless steel food bowl and water bowl. The nourishment tray may be easily adjusted vertically via a handy control panel for making it easier on a user to dispense a ration of pet-food and drinking-water into the bowls contained within the nourishment tray which may serve to reduce injury caused from excessive bending.

18 Claims, 6 Drawing Sheets

PET WAITER SYSTEMS

CROSS-REFERENCE TO RELATED APPLICATION

The present application is related to and claims priority from prior provisional application Ser. No. 61/649,548, filed May 21, 2012 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of pet food serving devices and more specifically relates to pet waiter systems comprising a multifunctional pet feeding system.

DESCRIPTION OF THE RELATED ART

Many individuals have pets. The task of feeding one's pet when at work or away from home may present problems. Many pet owners are familiar with the fact that a pet's food may attract ants or other crawling insects. Especially during warm weather, food left in an open container may become infested with bugs within a matter of hours and consumption may be unhealthy and distasteful for a pet. Quite often pets may just choose to go hungry, ignoring the infested food bowl altogether. As a result, the owner must discard and replace entire bowls of food which, over time, may prove to be very costly.

In addition, dogs and cats may become discouraged, not to mention hungry, when their owner is working late because of a business meeting or is tied up for hours in traffic. While keeping their pets sufficiently fed is a daily concern of pet owners, the challenge is exacerbated if they are planning on going on vacation. To ensure proper care for their companions, dog and cat owners will usually commission a friend or neighbor to feed their animals while they are away. Although these substitute caregivers have the best intentions, their own busy lives could hinder them from feeding the animal every time it is needed. Worried over such a scenario, pet owners may find themselves too concerned about the care of their pet to enjoy a relaxing time away from home. Lastly, even when the owner is present to monitor possible insect infestation and to feed the pet on time, the nourishment regimen may prove physically taxing on the person. Constantly bending over to fill bowls or to pick them up for cleaning may wreak havoc on bad backs, stiff joints, and arthritic muscles Various attempts have been made to solve the above-mentioned problems such as those found in U.S. Pat. No. 5,433,171 to Anthony S. Ewell; U.S. Pat. No. 6,135,056 to Yung-Fang Kuo; U.S. Pat. No. 6,988,465 to Sung Ho Park; U.S. Pat. No. 8,245,665 to Shelley Sue Willett; and U.S. Pat. No. 7,469,657 to Alec Drummond. This prior art is representative of automated pet food and water dispensers. None of the above inventions and patents, taken either singly or in combination, is seen to describe the invention as claimed.

Ideally, pet waiter systems should provide an easy-to-use pet nourishment system and, yet would operate reliably and be manufactured at a modest expense. Thus, a need exists for pet waiter systems, a multifunctional pet-food and drinking-water dispensing device to avoid the above-mentioned problems.

BRIEF SUMMARY OF THE INVENTION

In view of the foregoing disadvantages inherent in the known automatic pet food and water dispensing art, the present invention provides a novel pet waiter system comprising a multifunctional pet feeding device. The present invention provides owners with an easier means of meeting their pet's food and water needs, while also ensuring that the nourishment is free of contamination from insects.

Pet waiter systems are disclosed herein, in a preferred embodiment, comprising a pet nourishment station assembly, a container holding member, a tray elevator assembly, and a motor assembly. The pet nourishment station assembly may comprise a station stand, a vertical column, and a vertical column mount. The container holding member may include a food container holder and a water container holder. The tray elevator assembly may comprise a nourishment tray, a tray platform, a vertical track, a lift mechanism comprising a hoist, and a control panel comprising a power button and a LED power indicator. The motor assembly may comprise a motor housing, which further may comprise a wall mount affixed to a rear surface of the motor housing. In one embodiment, the motor may comprise an electric motor, and the power supply may comprise a power plug. A secondary power supply may comprise a battery that is rechargeable.

In referring now to the pet nourishment station assembly, the station stand may comprise a food-section, a mid-section, and a water-section. The vertical column may comprise a shaft having a bottom-end and a top-end. The bottom-end of the vertical column may be mounted to a top surface of the mid-section of the station stand via the vertical column mount.

The nourishment tray of the tray elevator assembly may comprise a food bowl receptacle and a water bowl receptacle for receiving a food bowl and a water bowl respectively. The food bowl and the water bowl are preferably manufactured of stainless steel for longevity in use. Further, the nourishment tray comprises a food bowl size adjuster for adjusting a size of the food bowl, and the nourishment tray further comprising a water bowl size adjuster for adjusting a size of the water bowl. This may be useful in adjusting each receptacle to fit the size of small and large bowls as pets grow and mature over time.

The container holding member may be fixedly mounted to a front portion near the top-end of the vertical column. The food container holder may be located at a first-end of the container holding member and may retain a food container such that the food container is suspended above the food-section of the station stand. Further, the water container holder may be located at a second-end of the container holding member and retains a water container such that the water container is suspended above the water-section of the station stand. It should be appreciated that the food container comprises a first manually-operated lever for distributing pet food into the food bowl and the water container comprises a second manually-operated lever for distributing the drinking water into the water bowl. In a preferred embodiment, the food bowl and the water bowl of the station stand each comprises a lid for protecting the food bowl and the water bowl respectively from unwanted entry of insects and bacteria during non-use of the pet waiter systems.

With particular reference to the tray elevator assembly of the pet waiter systems, the vertical track of the tray elevator assembly may run vertically from the bottom-end to the top-end along the shaft of the vertical column. The tray platform may provide a support for holding the nourishment tray and may comprise a planar surface which may be connected to the vertical track. The lift mechanism may be connected to the tray platform within the vertical column. The motor housing of the motor assembly may be fixedly mounted to a rear portion near the top-end of the vertical column. At least one motor and power supply is housed within the motor housing. In operation, the power supply powers the motor and the motor is in electric communication with the lift mechanism. The motor may drive the nourishment tray up and down in relation to the station stand along the vertical track of the vertical column via the lift mechanism. A user may use the control panel to selectively manipulate the nourishment tray up and down via a switch. The pet nourishment station assembly, the tray elevator assembly, and the motor assembly may work in combination to form the pet waiter systems, and the pet waiter systems may serve to efficiently dispense a ration of pet food and drinking water for feeding and nourishing a pet while conserving physical energy and injury caused by excessive bending.

A method of use for the pet waiter systems may comprise the steps of: filling a food container with pet-food; filling a water container with drinking-water; and dispensing the pet-food and the drinking-water via a first manually-operated lever and a second manually-operated lever respectively. The method of use for the pet waiter systems may further comprise an optional step of manipulating a pet nourishment tray vertically up and down via a control panel of the pet waiter systems.

The present invention holds significant improvements and serves as a pet waiter system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, pet waiter systems, constructed and operative according to the teachings of the present invention as described herein.

The various embodiments of the present invention will hereinafter be described in conjunction with the appended drawings, wherein like designations denote like elements.

DETAILED DESCRIPTION

As discussed above, embodiments of the present invention relate to a pet feeding device and more particularly to a pet waiter as used to improve the efficiency of feeding and nourishing pets.

Generally speaking, the pet waiter systems may comprise a multifunctional pet nourishment station that elevates the pet's bowls while also providing a feeding and watering systems. Rectangular in shape in preferred embodiments, this novel appliance preferably features dimensions of approximately three feet (3') in height, nine inches (9") in width, and three inches (3") in depth. The Pet Waiter may be fashioned from a titanium or steel material for optimal durability. The bottom of the unit may offer a rectangular tray systems, which would house the pet's food and water bowls. Further, the provided dishes with the product may be expandable, to increase in size as a puppy or kitten grows into an adult dog or cat. The present invention may be used indoors or outdoors, and may be powered by a power plug or a battery that may be rechargeable. Dish covers may also be provided with the system to protect food and water when the pet is not enjoying them.

Positioned on a raised platform, the bowl tray is integrally attached to a vertical column, which serves as a conveyance for raising and lowering the nourishment tray as needed. A switch-operated mechanism comprising a control panel may be located at the top of the vertical column to activate pet waiter systems. When turned on, this switch may move the nourishment tray along a conveyor belt to the desired height. The feeding and watering system of pet waiter systems preferably comprises two (2) food and water canisters that are generally cylindrical in shape. Secured at the top of the appliance and capped with a lid equipped with a durable rubber seal to maintain freshness, each of these compartments sufficiently stores a user-determined amount of food and water.

Positioned inside the canisters, a manually operated lever may be provided for manually dispensing the food and water. In an alternative embodiment, each canister may comprise a time-operated release door which may serve to distribute food and water down an open, tapered chute, which leads straight into the provided feeding and watering bowl.

Pet waiter systems may afford pets, and pet owners, many significant benefits and advantages. First, this invention effectively prevents the infestation of pet food by ants and other crawling insects. Handily elevating the bowls from the accessibility of the floor, pet waiter systems may prevent an animal from getting sick from consuming food which has been infested, saving owners the cost of incurring subsequent veterinary bills.

In addition, the unique design of pet waiter systems eliminates the need to continually change out food which has attracted ants and other bugs, thereby maximizing the life of a pet's food and adding up to a large savings in reduced purchases. The added bowl lids also keep insects away, while also preventing dust and dirt from entering the pet dishes. Another important advantage of pet waiter systems is that it provides pet owners with an easy and convenient means of keeping their animals fed and hydrated while away from home. Incorporating a manual food and water dispenser system, this handy product supplies dogs and cats with their daily meals at the times they are used to eating. Whether a dog owner will only be out for one evening or a cat owner will be out for several days, pet waiter systems intricately designed controls provide fresh food and water for pets for the entire duration.

Figure 1:
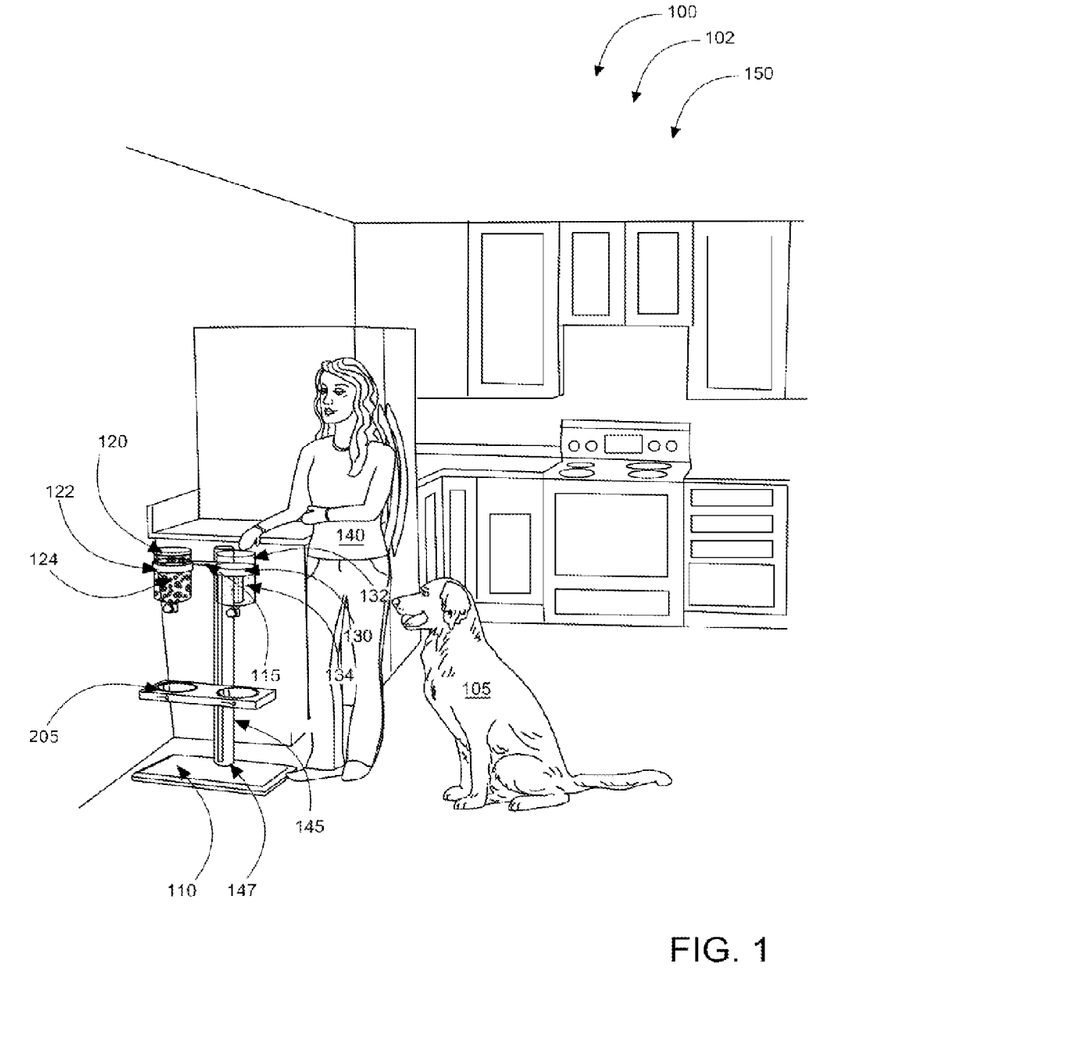
FIG. 1 shows a perspective view illustrating pet waiter systems comprising a pet nourishment station in an 'in-use' condition comprising a food container and a water container which is being filled by a user according to an embodiment of the present invention.

Referring now to the drawings by numerals of reference there is shown in FIG. 1, pet waiter systems 100 during 'in-use' condition 150 according to an embodiment of the present invention.

Pet waiter systems 100 may comprise pet nourishment station assembly 102. Pet nourishment station assembly 102 may generally comprise station stand 110, vertical column 145, and vertical column mount 147. Station stand 110 of pet nourishment station assembly 102 may comprise a food-section, a mid-section, and a water-section. Vertical column 145 may comprise a shaft having a bottom-end and a top-end. As shown, the bottom-end of vertical column 145 is mounted to a top surface of the mid-section of station stand 110 via vertical column mount 147.

Pet waiter systems 100 may further comprise container holding member 115 which may include food container holder 120 and water container holder 130. Food container holder 120 is located at a first-end of container holding member 115 and retains food container 122 such that food container 122 is suspended above the food-section of station stand 110. Water container holder 130 is located at a second-end of container holding member 115 and retains water container 132 such that water container 132 is suspended above the water-section of station stand 110. Food container holder 120 of container holding member 115 may be useful for retaining food container 122 which may contain pet-food 124. Pet-food 124 may then be selectively dispensed to pet 105 by user 140. Water container holder 130 of container holding member 115 may be useful for retaining water container 132 for holding drinking-water 134 which also may be selectively dispensed to pet 105 by user 140. It should be appreciated that pet nourishment station assembly 102 and container holding member 115 may be formed of durable plastic material for long lasting use.

Figures 4A, 4B, 4C:
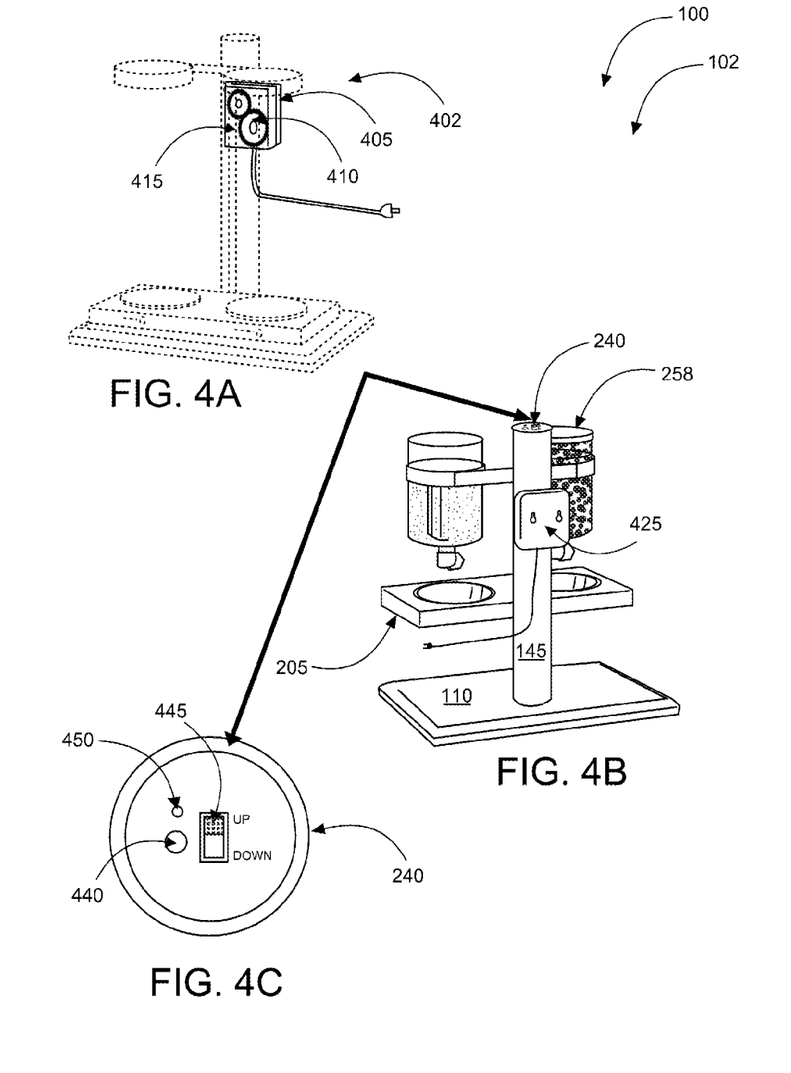
FIGS. 4A and 4B are front and rear perspective views of pet waiter systems according to an embodiment of the present invention of FIGS. 1-3.
FIG. 4C is a close-up perspective view of a control panel of pet waiter systems for raising and lowering the nourishment tray according to an embodiment of the present invention of FIGS. 1-3.

In continuing to refer to FIG. 1, pet waiter systems 100 may further comprise tray elevator assembly 202 and motor assembly 402. Tray elevator assembly 202 may comprise nourishment tray 205, tray platform 225, vertical track 230, lift mechanism 235, and control panel 240. Motor assembly 402, shown better in FIGS. 4A-B, is useful for operating tray elevator assembly 202 and may comprise motor housing 405, motor 410, and a power supply. As shown in FIG. 1, user 140 may easily and conveniently feed at least one pet 105 using pet waiter systems 100 without having a need to excessively bend down at the waist, thus serving to prevent unnecessary injury.

Figure 2:
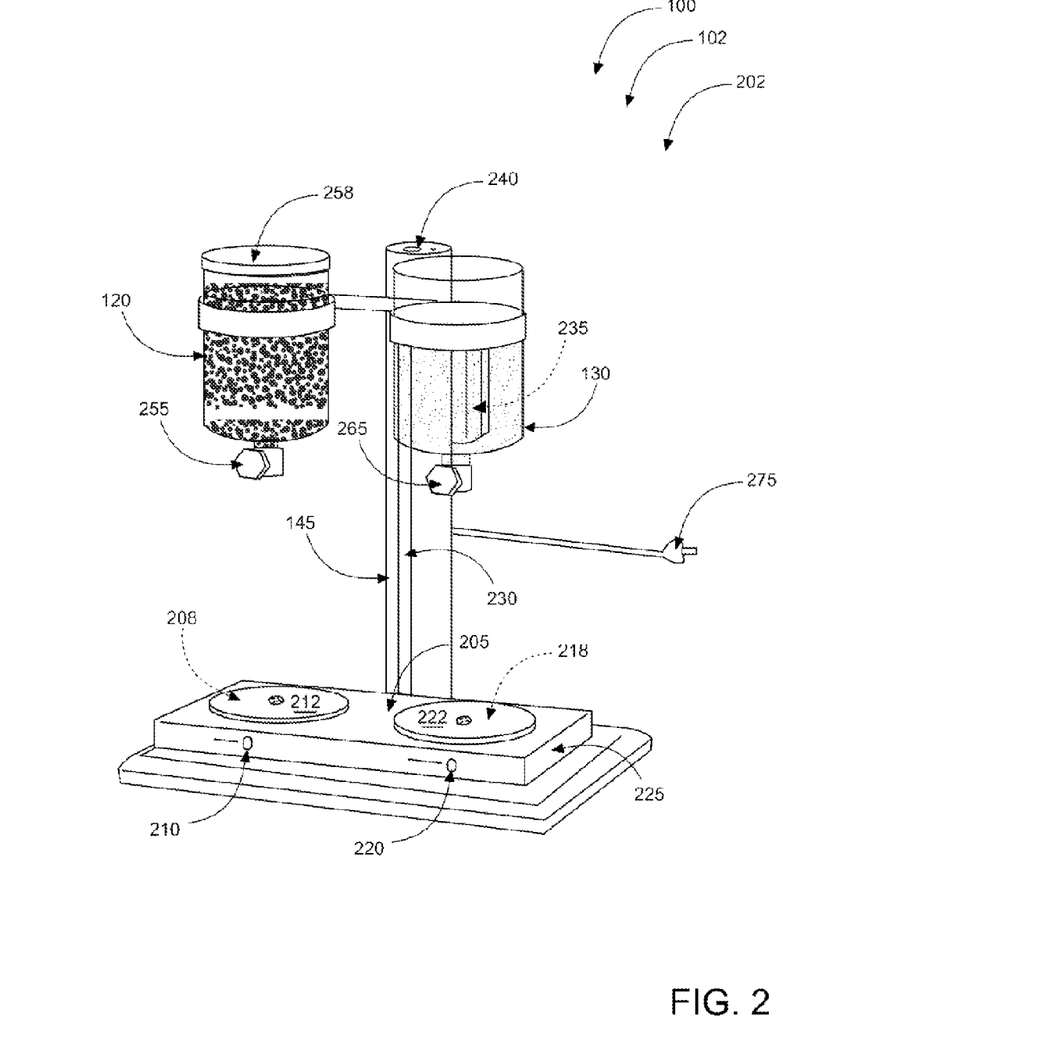
FIG. 2 is a perspective view of pet waiter systems in a 'non-use' condition showing a food bowl protected by a food bowl lid and a water bowl protected by a water bowl lid according to an embodiment of the present invention of FIG. 1.

Referring now to FIG. 2, illustrating a perspective view of pet waiter systems 100 in a 'non-use' condition showing food bowl 208 and water bowl 218 of nourishment tray 205 protected by food bowl lid 212 and water bowl lid 222 according to an embodiment of the present invention of FIG. 1. In one embodiment, food container holder 120 and water container holder 130 may comprise canisters that are cylindrical in shape and manufactured of light-weight, durable plastic. Food container holder 120 may also comprise food container seal 258 which may provide an air-tight rubber seal for providing maximum freshness of pet-food 124 when secured. Food container seal 258 may further serve to prevent bacteria and bugs from entering food container holder 120 thereby reducing sickness to pet 105.

In continuing to refer to FIG. 2, it may be seen that vertical track 230 of tray elevator assembly 202 runs vertically from the-bottom end to the top-end of the shaft within vertical column 145. Tray platform 225 of tray elevator assembly 202 may comprise a planar surface and may be connected to vertical track 230 via a connector. Tray platform 225 holds nourishment tray 205. Lift mechanism 235 of tray elevator assembly 202 is connected to tray platform 225 within vertical column 145.

In continuing to refer to FIG. 2, tray elevator assembly 202 may comprise food bowl size adjuster 210 located underneath food bowl 208 of nourishment tray 205 for adjusting a size of food bowl 208. Tray elevator assembly 202 may further comprise water bowl size adjuster 220 located underneath water bowl 218 of nourishment tray 205 for adjusting a size of water bowl 218. In one embodiment, food bowl size adjuster 210 and water bowl size adjuster 220 may comprise a horizontally adjustable slide bar for increasing and decreasing a volume pet-food 124 and drinking-water 134 to be retained by food bowl 208 and water bowl 218 respectively. Preferably, food bowl 208 and water bowl 218 each preferably comprise stainless steel.

In one embodiment, food bowl size adjuster 210 and water bowl size adjuster 220 may comprise adjustable sliding arches located within food bowl 208 and water bowl 218. As user 140 adjusts food bowl size adjuster 210 and water bowl size adjuster 220, the sliding arches either contract to permit more volume or expand to permit less volume.

Figure 3:
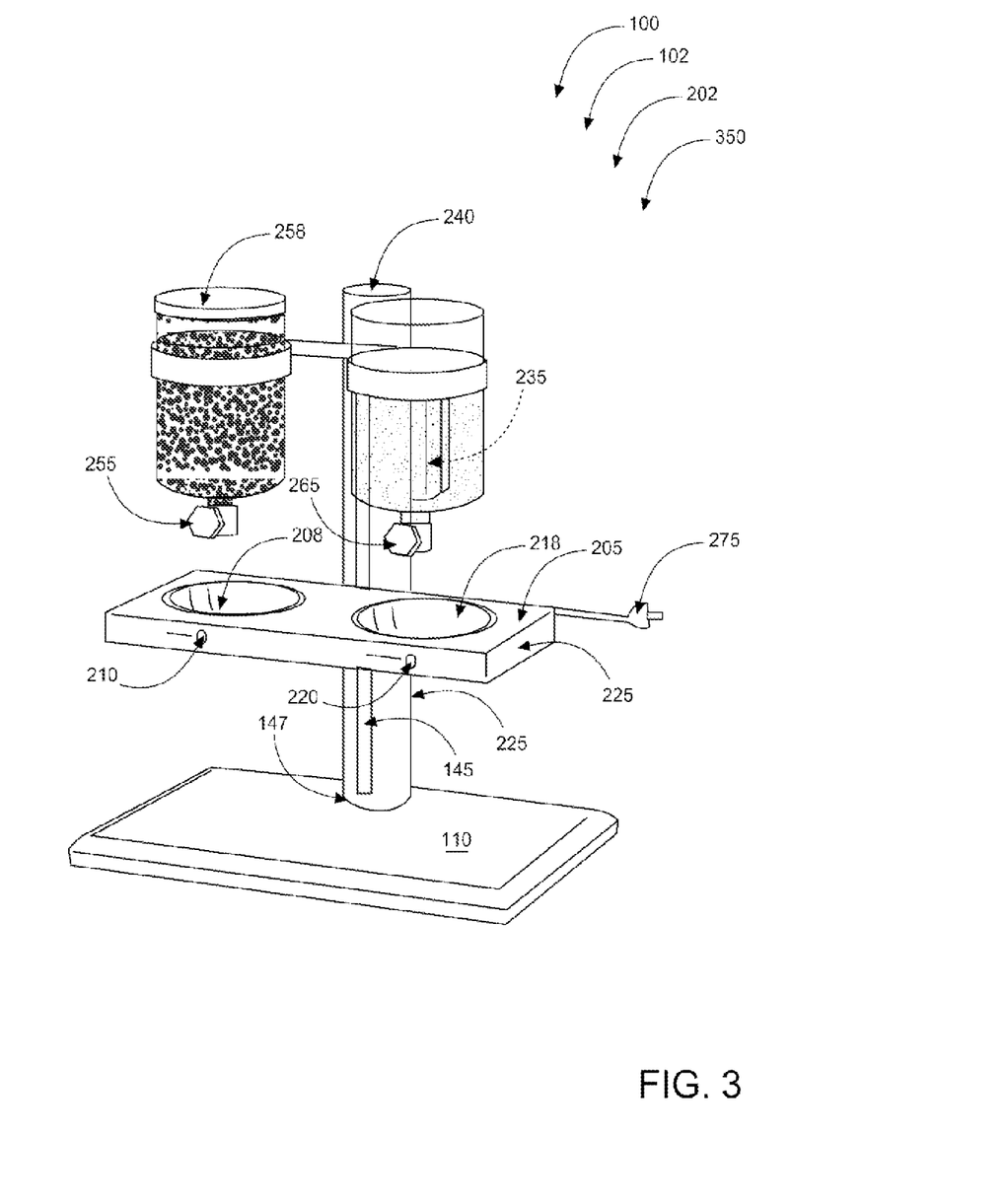
FIG. 3 is a perspective view of pet waiter systems in an 'in-use' condition showing a nourishment tray elevated by a motor assembly for receiving food and water into food and water bowls according to an embodiment of the present invention of FIGS. 1-2.

Referring now to FIG. 3, illustrating a perspective view of pet waiter systems 100 during 'in-use' condition 350 showing a nourishment tray elevated by a motor for receiving food and water into their bowls according to an embodiment of the present invention of FIGS. 1-2. As shown, nourishment tray 205 of tray elevator assembly 202 may comprise a food bowl receptacle and a water bowl receptacle for receiving food bowl 208 and water bowl 218 respectively. It should be appreciated that food bowl 208 and water bowl 218 may be removed from the food bowl receptacle and the water bowl receptacle of nourishment tray 205 for easy cleaning thereof.

Referring now to FIG. 4A showing a front perspective view of pet waiter systems 100 according to an embodiment of the present invention. Motor assembly 402 may comprise motor housing 405, motor 410, and a power supply. As shown, motor housing 405 may comprise a secure enclosure fixedly mounted to the top-end of a rear portion of vertical column. Motor housing 405 may serve to securely contain motor 410 and the power supply.

In one embodiment, motor 410 may comprise an electric motor. The power supply, such as (DC) battery 415 or (AC) power plug 275, may power motor 410. Motor 410 may thereby be in electric communication with lift mechanism 235 via electric wiring. It may be appreciated that motor 410 drives nourishment tray 205 up and down in relation to station stand 110 along vertical track 230 of vertical column 145 via lift mechanism 235, as controlled by user 140 operating control panel 240. This may be especially useful such that user 140 need not excessively bend over or reach down to fill food bowl 208 and water bowl 218.

In continuing to refer to FIG. 4A, the power supply of pet waiter systems 100 may comprise power plug 275. Power plug 275 may plug into a conventional electric outlet for providing power to motor 410. Alternatively, as shown in FIG. 4A, the power supply may comprise at least one battery 415. In such a manner, pet waiter systems 100 powered by at least one battery 415 may be used in an area that is not located near an electric outlet. This may provide In one embodiment, lift mechanism 235 may comprise a hoist for moving tray platform 225 supporting nourishment tray 205 vertically up and down vertical track 230. Hoist may comprise either wire or rope which may be wrapped around a drum. Alternatively hoist may comprise a load-chain, whereby tray platform 225 may be raised by a pulley having a special profile to engage the chain within vertical column 145.

In another embodiment, lift mechanism 235 may comprise a conveyor belt. The conveyor belt may comprise two pulleys having a belt that may rotate about them. The belt may be connected to tray platform 225 which provides support to nourishment tray 205. One or both of the pulleys may be powered by the power supply, thus moving the belt forward. Other means for movement may be used.

Referring now to FIG. 4B, showing a rear perspective view of pet waiter systems 100 according to an embodiment of the present invention. Vertical column 145 of pet nourishment station assembly 102 may comprise wall mount 425. Wall mount 425 may comprise a holding base having a pair of notches which may be used to hang pet waiter systems 100 to a flat surface, such as a wall. It should be appreciated that wall mount 425 is provided for offering user 140 a different manner for supporting pet waiter systems 100 in addition to station stand 110 and need not be used in all instances.

Referring now to FIG. 4C showing a close-up perspective view of control panel 240 of pet waiter systems 100 for raising and lowering nourishment tray 205 according to an embodiment of the present invention of FIGS. 1-3. As shown, control panel 240 may comprise power button 440 for powering on and off pet waiter systems 100. Once activated, nourishment tray 205 of tray elevator assembly 202 may be adjusted vertically along vertical track 230 via up/down button 445. Further, control panel 240 may comprise LED power indicator 450 for visually indicating an active or an inactive condition of pet waiter systems 100. In one embodiment, as shown in FIG. 4B, control panel 240 may be installed atop vertical column 145 for optimal ease-of-accessibility to user 140. It should be noted and appreciated that in alternative embodiments, control panel 240 may be located elsewhere on pet waiter systems 100.

In one embodiment of the present invention, pet waiter systems 100 may further comprise a wireless transceiver which may be in communication with a remote control unit comprising control panel 240 for wirelessly operating nourishment tray 205.

Figure 5:
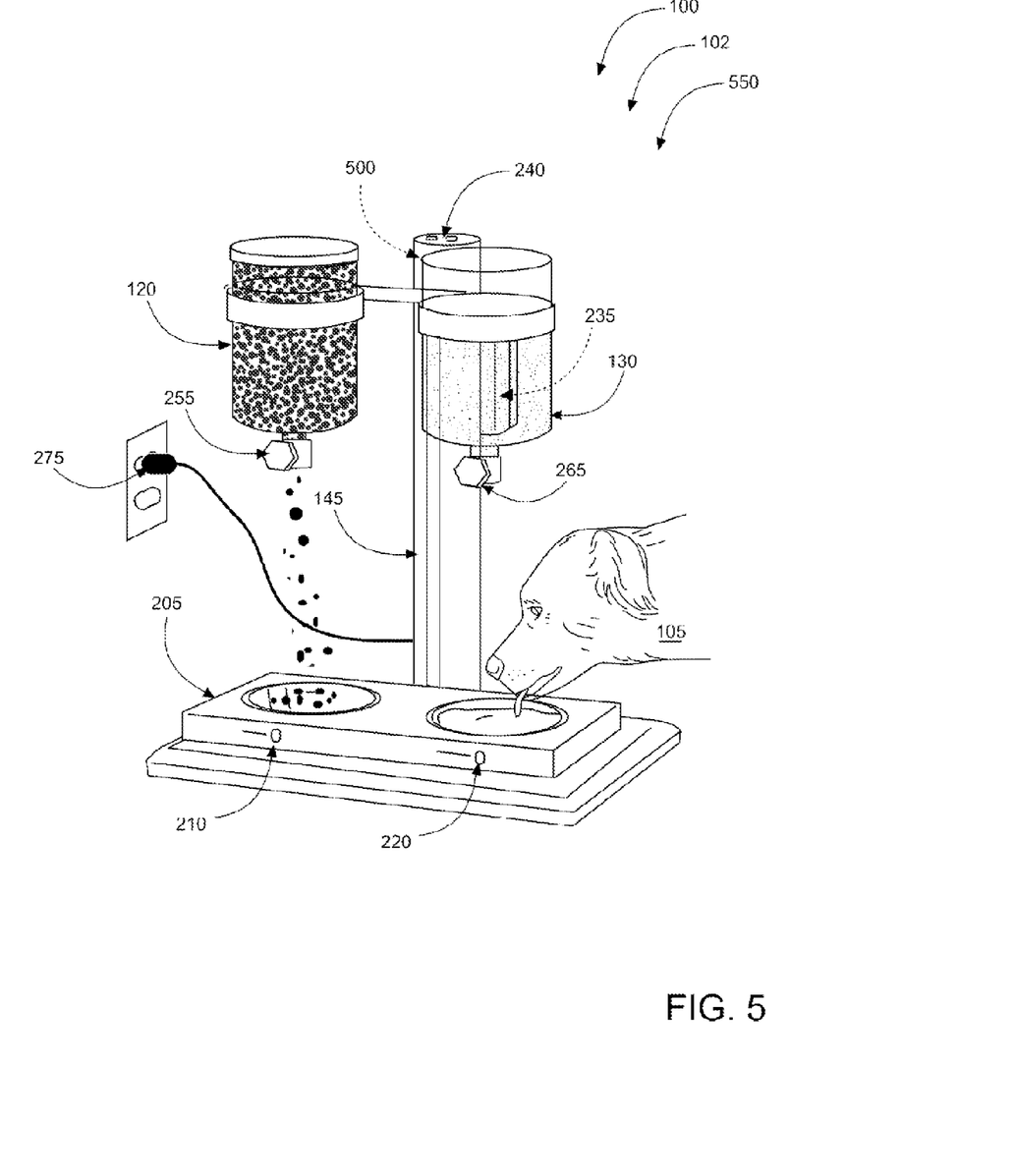
FIG. 5 shows a perspective view illustrating the pet waiter systems in an 'in-use' condition showing a pet waiting to be automatically fed and hydrated according to an embodiment of the present invention.

Referring now to FIG. 5 showing a perspective view illustrating pet waiter systems 100 during 'in-use' condition 550 showing pet-food 124 being automatically dispensed into food bowl 208 according to an embodiment of the present invention. Pet waiter systems 100 may comprise programmable processor 500. Programmable processor 500 may be in communication with control panel 240 and with motor assembly 402. User 140 may use programmable processor 500 to input various commands for automatically dispensing pet-food 124 and drinking-water 134. In one example, user 140 may program programmable processor 500 to dispense pet-food 124 and drinking-water 134 at certain times of the day. In another example, user 140 may program a ration size of pet-food 124 and drinking-water 134 to control the amount of each is released at a particular delivery. These two examples may be especially useful if user 140 intends to take a short trip and wants to provide pet 105 with continued, time delivery of pet-food 124 and drinking-water 134.

Figure 6:
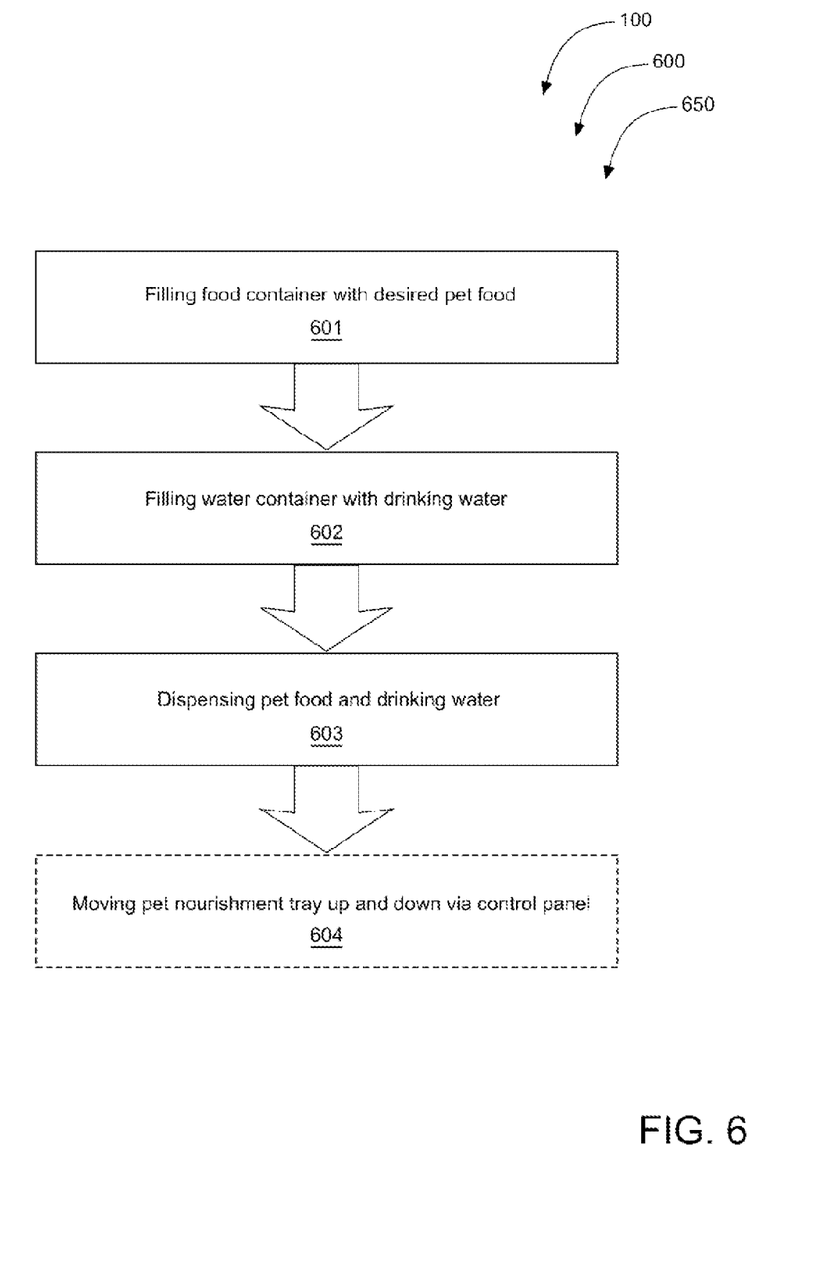
FIG. 6 is a flowchart illustrating a method of use according to an embodiment of the present invention of FIGS. 1-5.

Referring now to FIG. 6, showing flowchart 650 illustrating method of use 600 according to an embodiment of the present invention of FIGS. 1-5. Method of use 600 for pet waiter systems 100 may comprise the steps of: step one 601, filling food container 122 with pet-food 124; step two 602, filling water container 132 with drinking-water 134; and step three 603, dispensing with pet-food 124 and drinking-water 134 via food container dispenser 255 and water container dispenser 265 into food bowl 208 and water bowl 218 respectively.

In continuing to refer to FIG. 6, method of use 600 of pet waiter systems 100 may further comprise an optional step of automatically adjusting nourishment tray 205 holding food bowl 208 and water bowl 218 vertically up and down vertical column 145 via control panel 240 of pet waiter systems 100.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A pet waiter systems comprising:
   a pet nourishment station assembly comprising:
     a station stand;
     a vertical column; and
     a vertical column mount;
   a container holding member comprising;
     a food container holder; and a water container holder;
a tray elevator assembly comprising:
    a nourishment tray;
    a tray platform;
    a vertical track;
    a lift mechanism; and
    a control panel; and
a motor assembly comprising;
    a motor housing;
    at least one motor; and
    a power supply;
wherein said station stand comprises a food-section, a mid-section, and a water-section;
wherein said vertical column comprises a shaft having a bottom end and a top end;
wherein said bottom end of said vertical column is mounted to a top surface of said mid-section of said station stand via said vertical column mount;
wherein said container holding member is fixedly mounted to a front portion near said top end of said vertical column;
wherein said food container holder is located at a first-end of said container holding member and retains a food container such that said food container is suspended above said food-section of said station stand;
wherein said water container holder is located at a second-end of said container holding member and retains a water container such that said water container is suspended above said water-section of said station stand;
wherein said vertical track of said tray elevator assembly runs vertically from said bottom end to said top end within said shaft of said vertical column;
wherein said tray platform comprises a planar surface and is connected to said vertical track;
wherein said tray platform holds said nourishment tray;
wherein said lift mechanism is connected to said tray platform within said vertical column;
wherein said nourishment tray comprises a food bowl receptacle and a water bowl receptacle for receiving a food bowl and a water bowl respectively;
wherein said motor housing of said motor assembly is fixedly mounted to a rear portion near said top end of said vertical column;
wherein said at least one motor and said power supply is housed within said motor housing;
wherein said power supply powers said motor;
wherein said motor is in communication with said lift mechanism;
wherein said motor drives said nourishment tray up and down in relation to said station stand along said vertical track of said vertical column via said lift mechanism;
wherein said control panel selectively moves said nourishment tray up and down via a switch;
wherein said pet nourishment station assembly, said tray elevator assembly, and said motor assembly work in combination to form said pet waiter systems; and
wherein said pet waiter systems serves to efficiently dispense a ration of food and water for feeding and nourishing a pet while conserving physical energy and excessive bending.

2. The pet waiter systems of claim 1 further comprising a wall mount located on a rear surface of said motor housing.

3. The pet waiter systems of claim 2 wherein said nourishment tray comprises a food bowl size adjuster for adjusting a size of said food bowl for accommodating a user-preferred volume of said pet-food.

4. The pet waiter systems of claim 3 wherein said nourishment tray comprises a water bowl size adjuster for adjusting a size of said water bowl for accommodating a user-preferred volume of said drinking-water.

5. The pet waiter systems of claim 4 wherein said food container comprises a rubber seal.

6. The pet waiter systems of claim 5 wherein said food container comprises a first manually-operated lever for distributing said food into said food bowl.

7. The pet waiter systems of claim 6 wherein said water container comprises a second manually-operated lever for distributing said water into said water bowl.

8. The pet waiter systems of claim 7 wherein said food bowl receptacle and said water bowl receptacle of said station stand each comprise a lid for protecting said food bowl and said water bowl respectively from unwanted entry of insects and bacteria during non-use of said pet waiter systems.

9. The pet waiter systems of claim 8 wherein said food bowl and said water bowl of said nourishment tray comprises stainless steel.

10. The pet waiter systems of claim 9 wherein said motor comprises an electric motor.

11. The pet waiter systems of claim 10 wherein said control panel comprises a power button for powering on and off said pet waiter systems.

12. The pet waiter systems of claim 11 wherein said control panel comprises a LED power indicator for visually indicating an active or an inactive condition of said pet waiter systems.

13. The pet waiter systems of claim 12 wherein said power supply comprises a power plug connectible to a standard electrical outlet for powering said motor.

14. The pet waiter systems of claim 13 wherein said power supply comprises at least one battery that is rechargeable for powering said motor.

15. The pet waiter systems of claim 14 wherein said lift mechanism comprises a hoist.

16. The pet waiter systems of claim 14 wherein said lift mechanism comprises a conveyor belt.

17. The pet waiter systems of claim 1 wherein said tray elevator assembly comprises a programmable processor for permitting an automatic, timed release of said food and said water.

18. A pet waiter systems comprising:
    a pet nourishment station assembly formed of durable plastic comprising:
        a station stand;
        a vertical column; and
        a vertical column mount;
    a container holding member comprising;
        a food container holder; and
        a water container holder;
    a tray elevator assembly comprising:
        a nourishment tray, said nourishment tray comprising a food bowl receptacle and a water bowl receptacle for receiving a food bowl and a water bowl respectively, said food bowl and said water bowl formed of stainless steel, said nourishment tray comprising a food bowl size adjuster for adjusting a size of said food bowl, and said nourishment tray further comprising a water bowl size adjuster for adjusting a size of said water bowl;
        a tray platform;
        a vertical track;
        a lift mechanism comprising a hoist; and
        a control panel comprising a power button and a LED power indicator; and a motor assembly comprising;
a motor housing comprising a wall mount located on a rear surface of said motor housing;
at least one motor, said motor comprising an electric motor; and
a power supply, said power supply comprising a power plug;
wherein said station stand comprises a food-section, a mid-section, and a water-section;
wherein said vertical column comprises a shaft having a bottom end and a top end;
wherein said bottom end of said vertical column is mounted to a top surface of said mid-section of said station stand via said vertical column mount;
wherein said container holding member is fixedly mounted to a front portion near said top end of said vertical column;
wherein said food container holder is located at a first-end of said container holding member and retains a food container such that said food container is suspended above said food-section of said station stand;
wherein said water container holder is located at a second-end of said container holding member and retains a water container such that said water container is suspended above said water-section of said station stand;
wherein said food container comprises a first manually-operated lever for distributing said food into said food bowl;
wherein said water container comprises a second manually-operated lever for distributing said water into said water bowl;
wherein said food bowl receptacle and said water bowl receptacle of said station stand each comprise a lid for protecting said food bowl and said water bowl respectively from unwanted entry of insects and bacteria during non-use of said pet waiter systems;
wherein said vertical track of said tray elevator assembly runs vertically from said bottom end to said top end within said shaft of said vertical column;
wherein said tray platform comprises a planar surface and is connected to said vertical track;
wherein said tray platform holds said nourishment tray;
wherein said lift mechanism is connected to said tray platform within said vertical column;
wherein said motor housing of said motor assembly is fixedly mounted to a rear portion near said top end of said vertical column;
wherein said at least one motor and said power supply is housed within said motor housing;
wherein said power supply powers said motor;
wherein said motor is in communication with said lift mechanism;
wherein said motor drives said nourishment tray up and down in relation to said station stand along said vertical track of said vertical column via said lift mechanism;
wherein said control panel selectively moves said nourishment tray up and down via a switch;
wherein said pet nourishment station assembly, said tray elevator assembly, and said motor assembly work in combination to form said pet waiter systems; and
wherein said pet waiter systems serves to efficiently dispense a ration of food and water for feeding and nourishing a pet while conserving physical energy and excessive bending.

\* \* \* \* \*